Figure 1:
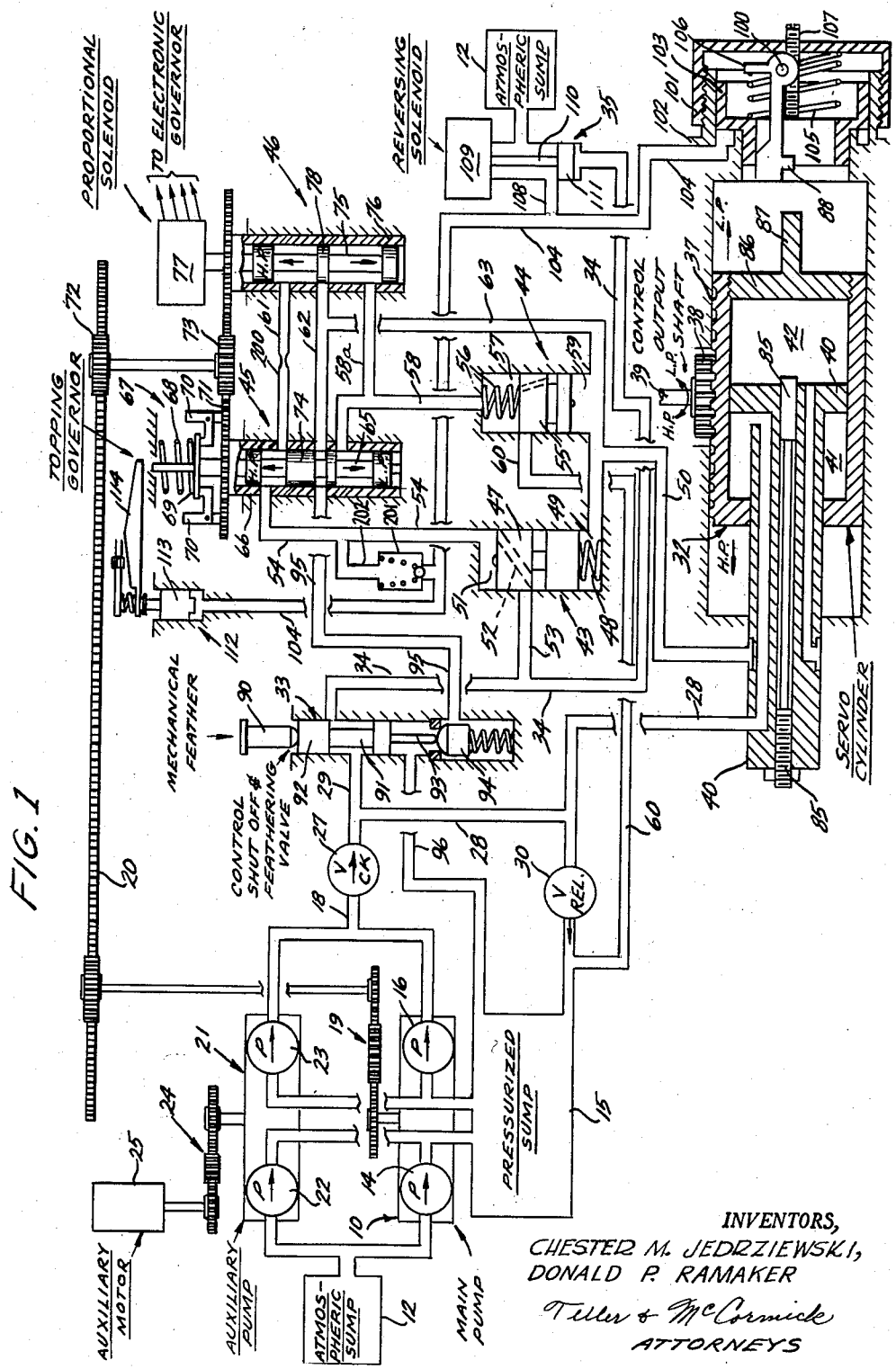

June 24, 1958

C. M. JEDRZIEWSKI ET AL 2,840,171

CONTROL SYSTEM FOR A VARIABLE PITCH PROPELLER

Filed Oct. 28, 1955

2 Sheets-Sheet 1

INVENTORS,
CHESTER M. JEDRZIEWSKI,
DONALD P. RAMAKER

*Tiller & McCormick*
ATTORNEYS

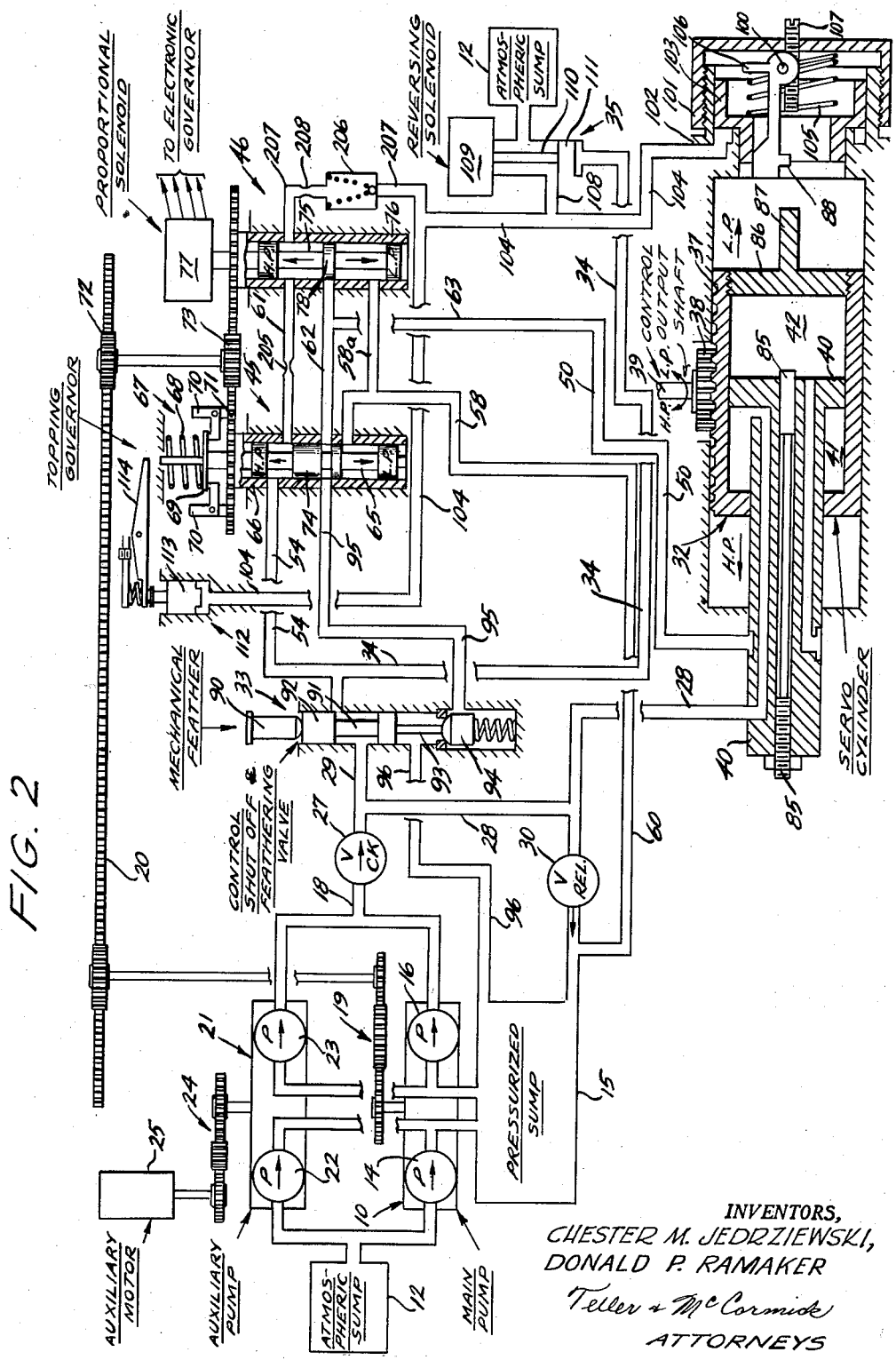

United States Patent Office 2,840,171
Patented June 24, 1958

2,840,171

CONTROL SYSTEM FOR A VARIABLE PITCH PROPELLER

Chester M. Jedrziewski, Rockville, and Donald P. Ramaker, Glastonbury, Conn., assignors to United Aircraft Corporation, East Hartford, Conn., a corporation of Delaware Application October 28, 1955, Serial No. 543,465

13 Claims. (Cl. 170—160.2)

This invention relates to aircraft propellers and, more particularly, to an improved propeller pitch control and servo system of the general type shown and described in the co-pending application of Stanley G. Best, Serial No. 426,061, filed April 28, 1954.

It is the general object of the invention to provide a control system for the pitch changing mechanism of an aeronautical propeller and which includes a source of hydraulic fluid under pressure for operating a servo motor to actuate the said pitch changing mechanism, and it is a more specific object of the invention to provide means for controlling the flow of hydraulic fluid to the servo motor in such a way that the blade angle may be decreased at a lesser rate than it is increased whereby to reduce the likelihood or possibility of propeller overspeeding during normal pitch changes and when the propeller is moved from the feathered position into the normal operating range. In addition to the foregoing, it is an object of the invention to provide the means for controlling pitch changing rate in the afore-described manner and which will not operate to limit the rate of reduction when the blade angle is being reversed.

As the description of the invention proceeds, it will become apparent that the control and servo system of this invention is not limited in application to any particular propeller or to any particular pitch changing mechanism. Therefore, the drawings do not include a disclosure of a propeller assembly or of a pitch change mechanism. U. S. Patent 2,652,122 to Longfellow may be relied upon for a disclosure of an exemplary propeller assembly and pitch change mechanism which can be operated by the pitch control and servo system of this invention.

Of the drawings:

Fig. 1 is a schematic illustration of an hydraulic pitch control and servo system for an aeronautical propeller assembly and which incorporates the features of the present invention; and Fig. 2 schematically illustrates the invention in a modified or alternative hydraulic control and servo system.

In its broadest aspects, the system of this invention may be said to include pump means for supplying the system with hydraulic fluid at a substantially constant pressure which fluid is directed to a reversible servo motor to drive the propeller pitch changing mechanism. The system also includes a pair of propeller speed responsive flow control valves which introduce the hydraulic fluid to the servo motor as required to cause operation thereof to effect a necessary pitch change. The system also includes valve means which are operable to control fluid flow to the flow control valves and/or the servo motor during extraordinary propeller pitch changes as, for example, when the propeller is feathered and unfeathered and when its pitch is reversed and returned to the positive pitch range. As a particular feature of this invention, means are provided for reducing the rate of movement of the servo motor, and thus the rate of the pitch change, in the low pitch direction as compared to the rate in the height pitch direction during normal operation of the servo system and when the propeller is moved from the feathered angle into the normal operating range. The invention is also featured by means for providing a relatively rapid rate of pitch change in the low pitch direction when the propeller blade angle is being moved into the reverse pitch range.

In describing the invention in greater detail and with specific reference to the drawings, it will be observed that the means providing the system with hydraulic fluid under substantially constant pressure comprise a main pump unit 10 which includes one pump 14 adapted to withdraw oil or other hydraulic fluid from an atmospheric sump 12 and to discharge the same into a pressurized sump 15. Another pump 16, included in the main pump unit, withdraws the oil from the pressurized sump 15 and discharge the same into the system through a conduit 18.

It is preferred that the aforementioned main pump unit 10 comprise a pair of gear pumps 14 and 16 arranged in tandem fashion and connected to a gear train 19 driven by a gear 20 which rotates with the propeller. As shown in the aforementioned Longfellow patent, the drive gear 20 may comprise a large diameter gear forming a part of the hub section of the propeller so as to rotate at equal speed therewith. Accordingly, during normal propeller operation, the tandem pump unit 10 and the sumps 12 and 15 provide a source and means for continuously introducing hydraulic fluid under pressure to the control system.

A generally similar tandem pump unit 21, including the pumps 22 and 23, is adapted to supply the system during the periods that the propeller is not rotated. More specifically, the pump unit 21 is driven through a gear train 24 by an electric motor 25 which may be manually controlled for operation while the propeller is feathered or during very low speed engine operation. While not a part of this invention, it will be readily understood that automatically operable means may be utilized to energize and de-energize the auxiliary motor 25 at preselected propeller operating speeds or positions.

The hydraulic fluid which is introduced to the system through the line 18 passes first through a check valve 27 to maintain pressure within the system. Having passed the check valve 27, the hydraulic fluid passes into two main intercommunicating branch lines or passages 28 and 29. A high pressure relief valve 30 is connected in the line 28 to fix the upper limit of pressure within the system at a predetermined level, the valve 30 being connected to the pressurized sump 15 to drain thereinto in the event the selected pressure is exceeded within the system. The line 28 terminates within a servo cylinder 32 which, as will be more fully explained hereinafter, constitutes an important part of the servo motor and which transmits the motion and force to operate the propeller pitch changing mechanism (not shown).

The main branch line 29 extends into a normally open valve 33 which when closed shuts off a portion of the system and conditions the same for feathering the propeller. A passage or line 34 extending from the valve 33, and normally in communication with the main branch line 29, extends to a solenoid operated valve 35 which, as will be explained hereinafter, is utilized to condition the system for reversing the pitch of the propeller.

The various valves included in the system are shown in the positions they assume when no propeller pitch change is called for, as for example, when the propeller is rotating at the equilibrium or selected speed for a power setting selected and fixed by the pilot. Therefore, it may be said that the valves as shown reflect an "on speed" propeller operating condition. The particular angle of the blades is reflected in the position of the servo cylinder 32 which is arranged for axial reciprocation to increase and decrease the pitch or blade angle. More specifically, the servo cylinder 32 constitutes a rack having teeth indicated at 37 which engage a pinion 38 fixed to an output shaft 39 to transmit motion and force to the propeller pitch changing mechanism. Assuming that rotation of the shaft 39 in the counterclockwise direction, as indicated by the arrow, causes a change toward low pitch, it will be seen that righthand movement of the cylinder is accompanied by movement of the propeller towards low pitch and that left-hand movement of the cylinder is accompanied by propeller movement towards high pitch.

As shown in the drawing, the cylinder 32 is arranged to reciprocate over a fixed piston 40. The hydraulic fluid under pump pressure in the line 28 is introduced to the cylinder in the chamber 41 on the left-hand side of the piston 40. The cylinder 32 is exposed over substantially less area to the chamber 41 than to the chamber 42 defined at the other end of the cylinder. For exemplary purposes, it may be assumed that the exposed left end face area of the cylinder is ½ the exposed right end face area thereof. Accordingly, it will be seen that fluid within the chamber 42 under half the pressure of the fluid within the chamber 41 (half pump pressure) will effect a pressure balance on the opposite ends of the cylinder 32 so that no movement of the said cylinder will be effected. It will be readily understood that cylinder reciprocation can be brought about by fluid flow into and out of one or both of the chambers 41 and 42. It has been found most convenient to cause reciprocation of the cylinder 32 by fluid flow into and out of the chamber 42. Fluid flow into the chamber 42 will, of course, increase the fluid pressure therein while flow from the chamber 42 will decrease the pressure therein. If the increase in fluid or servo pressure ($P_s$) in chamber 42 is in excess of the operating load and forces imposed on the cylinder 32, the said cylinder will be moved toward the right to cause propeller change in the low pitch direction. If the decrease in servo pressure ($P_s$) in chamber 42 is in excess of the operating load and forces imposed on the cylinder 32, the said cylinder will be moved toward the left to cause propeller change in the high pitch direction.

As set forth in the aforesaid Best application, means are provided for producing fluid pressure a fixed amount greater than pressure ($P_s$) within the chamber 42 and other means are provided to produce fluid pressure a fixed amount less than $P_s$ pressure, the produced pressures being used for servo motor operation. The said pressure producing means comprise a pair of pressure regulating valves indicated generally by the reference numerals 43 and 44. The pressure regulating valves 43 and 44 are connected to two flow control valves 45 and 46, the valve 46 being adapted during normal operation to selectively connect the pressure regulating valves 43 and 44 with the servo chamber 42, and the valve 45 being included as a safety flow control valve to prevent propeller overspeeding.

With specific reference to the valve 43, it will be noted that the same includes an axially movable valve member 47 which is biased in one direction by a spring 48. The chamber 49 surrounding the said spring communicates with the servo chamber 42 through the passage 50 which extends through the piston 40. Accordingly, the fluid pressure within the spring chamber 49 is equal to the fluid pressure ($P_s$) in the servo chamber 42 and exerts pressure against the bottom of the valve member 47 which pressure is supplemented by the force of the spring 48. The fluid pressure and spring force tend to move the valve member 47 upwardly to close a chamber 51 at the top end of the valve member. However, when the valve member 47 is shifted upwardly, a passage 52, extending at an oblique angle through the valve member and opening into the chamber 51, is brought into communication with a passage 53 connected to the line 34 having hydraulic fluid at pump pressure. For the purpose of fully understanding the operation of the valve 43, it may be assumed that pump pressure is considerably greater than servo pressure ($P_s$) during all anticipated operating conditions. It can also be assumed that the spring 48 exerts a force on the valve member having a pressure equivalent less than the difference between pump pressure and servo pressure. Therefore, the chamber 51 will become filled with hydraulic fluid which presses the valve member 47 downwardly in opposition to the combined fluid and spring pressure in the chamber 49. When the valve member 47 is thrust downwardly to the position shown, the internal passageway 52 will no longer be connected to the source of hydraulic fluid at pump pressure and pressure in the chamber 51 will equal the servo pressure within the spring chamber 49 plus the pressure equivalent exerted by the spring 48. In other words, the chamber 51 in the valve 43 provides a source of hydraulic fluid at a pressure a fixed amount greater than the pressure ($P_s$) within the servo chamber 42. Assuming spring 48 to have a pressure equivalent of 30 p. s. i., the high pressure chamber will always have fluid at 30 p. s. i. greater than servo pressure. As shown in the drawing, the high pressure chamber 51 is connected by the passage 54 to the uppermost part of the control valve 45.

The pressure regulating valve 44 includes an axially movable valve body 55 which is biased downwardly by a spring 56. The chamber 57 surrounding the spring 56 is connected by a passageway 58 to the lowermost port on the valve 45 and is also connected by the branch passageway 58a to the lowermost port on the valve 46. The chamber 59 on the opposite side of the movable member 57 is in communication with the servo chamber 42 through the passage 50. Accordingly, the fluid pressure within the chamber 59 will equal the pressure ($P_s$) within the servo chamber 42. It will be seen that the servo pressure within the chamber 59 must equal the fluid pressure within the chamber 57 plus the force of the spring 56 which, for purpose of illustration, may be assumed to exert a force on the valve body 55 equivalent to 30 p. s. i. of fluid pressure, or the valve member 55 will be thrust downwardly tending to close the chamber 59. However, when the valve body 55 is thrust downwardly from the position shown, a drain passage 60 is opened into the spring chamber 57. The said drain passage 60 extends to the pressurized sump 15 wherein the hydraulic fluid is contained at considerably less than servo pressure ($P_s$). Thus, the fluid pressure within the chamber 57 will be balanced in the position shown to close the drain passage. In such position of the valve member, the fluid pressure within the chamber 57 and passageway 58 will be 30 lbs. per sq. inch less than the pressure ($P_s$) within the servo chamber. The pressure drop between the lower faces of valve members 47 and 55 and the annular grooves therein is substantially constant.

As previously mentioned, the aforedescribed pressure regulating valves 43 and 44 are cooperatively associated with the control valves 45 and 46 which function to selectively connect fluid passages from the said pressure regulating valves to the servo cylinder chamber 42. Each of the said control valves includes an axially movable valve member which is subjected to movement in response to propeller speed changes. The valve 45, which may properly be referred to as a "topping governor valve," comprises a safety valve adapted to prevent serious overspeeding of the propeller. For normal operation of the propeller, i. e., over a preselected range of operating speeds, the movable valve member remains in substantially the position shown. When propeller speeds exceed the upper limit of the preselected range, the said valve member will be moved in a manner to be more fully described hereinafter.

The valve 46 may properly be referred to as a "proportional solenoid operated flow control valve" and functions to selectively control flow between the pressure regulating valves 43 and 44 and the servo chamber 42 throughout the said preselected range of operating speeds, thereby exercising precise speed control of the propeller in keeping with a selected power setting. As will be more fully described, electronic means are provided to transmit a signal to the coils of the solenoid, in response to propeller speed variations from the selected level, to shift the position of the movable member included in the valve structure. The said movable member is shown in the position assumed when no signal is being transmitted to the coils, as when the propeller is rotating at the selected speed.

Before describing the flow control valves 45 and 46 in detail, it is important to note that the high pressure passage 54 from the valve 43 communicates with the uppermost port on the valve 45 and that high pressure fluid flows through a a normally open port in the valve 45 into a passage 61 which communicates with the uppermost port in the solenoid operated distributor valve 46. It should also be noted that the intermediate ports of the valves 45 and 46 are interconnected by the line 62 which communicates with the servo chamber 42 by means of the passage 63. Accordingly, in top-to-bottom order the valves 45 and 46 are in communication with hydraulic fluid at pressures a fixed amount greater than the pressure (P$s$) in the servo cylinder chamber 42, at the pressure (P$s$) in the servo chamber and at a pressure a fixed amount less than servo chamber pressure (P$s$).

With more specific reference to the topping governor valve 45, it will be seen that the axially movable valve member is designated by the reference numeral 65. The said valve member moves within a sleeve 66 with the upper portion of the valve member extending above the sleeve and forming a part of a centrifugally operated governor mechanism indicated generally by the reference numeral 67. Included in the governor mechanism is a speeder spring 68 which is seated upon a plate 69 secured to the projecting portion of the valve member. The spring tends to force the valve member downwardly within the sleeve to the position shown. The spring force is opposed by a pair of flyweights 70, 70 which are pivotally mounted on a gear 71 to engage the bottom face of the plate 69. The gear 71 is driven by the propeller through gears 72 and 73, it being shown that gear 72 is engaged by the propeller ring gear 20. It will be readily understood that as the propeller rotates and gear 71 is driven, the flyweights 70, 70 tend to pivot outwardly and thereby exert a force on the valve member 65 in opposition to the speeder spring 68. Accordingly, the speeder spring may be selected to permit upward movement of the valve member at a preselected propeller speed. In accordance with the invention, upward movement of the valve member 65 is utilized to stop flow of high pressure oil toward the servo cylinder 32 so that there can be no low pitch movement of the said cylinder.

More specifically, the valve member 65 is provided with a land 74 adapted to selectively close the ports in communication with passages 61 and 62. During normal propeller operation, i. e., while the propeller is operating below the selected maximum speed, passage 62 (containing fluid at servo chamber pressure) will be closed at the valve 45 by the land 74. In this position of the valve member, high pressure flow is accommodated from the high pressure regulating valve 43 to the solenoid operated control valve 46 through passage 61. When centrifugal forces brought about by an overspeeding propeller overcome the force of the speeder spring and valve member 65 is shifted upwardly, the land 74 will close passage 61 and open valve 45 to the passage 62 containing fluid at servo chamber pressure (P$s$). In the last mentioned position of the valve member 65, fluid will flow through valve 45 from passage 62 into passageway 58 extending to the low pressure regulating valve 44. This flow of fluid at substantially the pressure present in the servo chamber 42 and valve chamber 59 will force valve body 55 downwardly in valve 44 so that drain passageway 60 is opened therein. Thereby, fluid from the servo chamber is drained to the pressurized sump, and the servo pressure (P$s$) is reduced to permit left-hand or high pitch movement of the servo cylinder.

From the foregoing description, it should be fully understood that the topping governor valve 45 provides means for limiting the speed of a propeller at a fixed level which is determined by selection of the speeder spring. During propeller operation at speeds below the selected limit, the valve 45 has no effect and permits flow of high pressure fluid to the solenoid operated flow control or distributor valve 46 whereupon said fluid may be utilized to decrease pitch and increase propeller speed in the exercise of exacting control of propeller speed.

With specific reference to the valve 46, it will be seen that a valve member 75 is arranged for movement within a sleeve 76 and projects thereabove. The projecting portion of the said member comprises the armature of a proportional solenoid 77 which may include one or more coils adapted upon being energized by signals to move the armature and valve member upwardly or downwardly, the magnitude of movement depending upon the potential of the signal. The means for transmitting the signal may comprise an electronic governor (not shown). The said electronic governor is arranged to sense a propeller speed variation from the speed in keeping with a selected power setting. More specifically, when the pilot makes a setting of his power controls, the propeller should rotate at a certain or specified speed for such power setting for optimum efficiency. Changes in air density and changes in aircraft flight attitudes will influence propeller speed. The electronic governor is actuated either by a change in the propeller speed when governing or by adjustment of the power setting to generate and transmit the proper signal to the solenoid 77 whereby to adjust the position of valve member 75 which, as will be shown, causes servo operation to increase or decrease propeller pitch for the purpose of controlling the propeller speed.

A land 78 is provided on the movable valve member 75 to close and selectively open the passage 62, which is connected to the servo chamber 42, for high pressure flow and for draining purposes. More specifically, the land 78 normally closes the passage 62, as when no correcting signal is transmitted by the electronic governor. When the valve member 75 is thrust downwardly by the solenoid, as will occur upon a signal transmitted as a result of underspeeding, the passage 62 is opened for the flow of fluid from the high pressure passage 61. The increase of pressure in passage 62 causes increased pressure (P$s$) in the servo chamber 42, resulting in a servo cylinder shift toward low pitch to increase propeller speed. When the valve member is elevated by the solenoid in response to propeller overspeeding, passage 62 will be opened to drain fluid from the servo chamber into the passage 58$a$ to the low pressure regulating valve 44.

It is important to observe that flow of fluid into chamber 42 increases the pressure (P$s$) therein. The new or increased pressure in chamber 42 is reflected in the pressure in the spring chamber 49 of the high pressure regulating valve 43. As previously described, an increase in pressure in the said spring chamber opens the valve 43 to the flow of fluid at pump pressure until the pressure in high pressure passages 54 and 61 is 30 p. s. i. in excess of the pressure in the spring chamber 49. Accordingly, as the servo pressure (P$s$) in chamber 42 increases, the pressure in high pressure passage 61 increases a corresponding amount and the pressure drop in control valve 46 from passage 61 to passage 62 will always be 30 p. s. i. As a result, the flow rate to the chamber 42 will not vary with pressure changes in the chamber 42 and the rate will be fixed by the opening afforded in the valve 46, said opening being determined by the amount of movement of the valve member 75 as is controlled by the proportional solenoid.

Flow from the chamber 42 through valve 46 will decrease the pressure (Ps) in the chamber 42 which decreased pressure (Ps) is also present in chamber 59 of the low pressure regulating valve 44. As previously described, a decrease in pressure in chamber 59 opens the valve 44 to drain until the pressure in low pressure passages 58 and 58a is 30 p. s. i. below the pressure (Ps) in servo chamber 42. Accordingly, as the servo pressure (Ps) in chamber 42 decreases, the pressure in passage 58a decreases a corresponding amount and the pressure drop in control valve 46 from passage 62 to passage 58a will always be 30 p. s. i. As a result, the flow rate from servo chamber 42 will not vary with pressure changes in chamber 42 and the rate will be fixed by the valve 46 as controlled by the proportional solenoid.

It will be understood then that flow to or from the servo chamber 42 will be fully controlled by the valve 46 which selectively connects the servo chamber to a valve 43 regulating the pressure of an hydraulic fluid source to a pressure a fixed amount (30 p. s. i.) greater than servo pressure or to a valve 44 regulating pressure in a sump conduit to a pressure a fixed amount (30 p. s. i.) less than servo pressure. Therefore, there is a fixed constant pressure drop to or from the servo chamber 42 and the valve 46 controls the rate of flow to or from the servo chamber in response to the signal transmitted to its solenoid 77. Now, it will be quite apparent that a signal to valve 46 calling for a correction in the low pitch direction should cause flow through valve 46 to the servo chamber 42 at a rate equal to the rate of flow from the chamber 42 through valve 46 when an equal signal is received calling for a correction in the high pitch direction. Such actually is the case in the system as thus far described and in the system shown in the aforementioned Best application. However, in the system of this invention, means are provided to limit the rate of flow from the high pressure regulating valve 43 to the control valve 46 thus limiting the rate at which fluid will flow to the servo chamber and thus limiting or reducing the rate at which the pitch or blade angle of the propeller can be decreased. The aforementioned rate limiting means will be described in detail hereinafter.

It is believed that a description of the operation of the servo control system as thus far described will serve to further the understanding of the invention. Assuming that there is no hydraulic fluid within the system and that the aircraft engine is not operating, it will be apparent that the auxiliary motor 25 must be energized to operate pump unit 21 to supply the system with hydraulic fluid. Having passed the check valve 27, the hydraulic fluid is introduced to the two main branch lines 28 and 29. The fluid passing through the line 28 will reach the chamber 41 within the servo cylinder 32. Since there is no fluid pressure within the servo chamber 42, the servo cylinder will be shifted toward the left to increase propeller pitch. The extent of movement of the servo cylinder in the high pitch direction may be limited by an elongated stop rod 85 which is adjustably secured within the piston 40. The said stop rod may be adjusted to project as desired into the servo chamber 42 so as to engage the plate 86 closing the right-hand end of the servo cylinder in a selected position of the cylinder. Accordingly, the extent of high pitch movement of the cylinder may be limited to correspond to a propeller pitch angle less than a full feather position. However, it is preferred that the stop rod 85 be fixed to permit a change in the pitch angle of the propeller to a full feather position. Thus, for the purpose of this description, it may be assumed that the servo cylinder 32 can be shifted far enough to permit feathering of the propeller.

The hydraulic fluid which enters the main branch line 29 passes through the normally open shut off valve 33 into the passage 34 for flow to the solenoid operated reversing valve 35 and for flow to the high pressure regulating valve 43. Since no fluid under servo pressure is admitted to the valve 43, the valve member 47 will be shifted upwardly by the spring 48 to permit high pressure flow through the line 54 and the topping governor valve 45 to the proportional solenoid operated valve 46. Since there is normally no signal transmitted to the proportional solenoid valve during engine inoperation, the solenoid operated valve member 75 will assume the neutral position shown. In such position, there can be no flow of high pressure fluid to the servo cylinder 42. Therefore, in order to supply the servo chamber with hydraulic fluid, it is necessary to impose a signal upon the proportional solenoid 77 to thrust the valve member 75 downwardly. It may be desirable to have a manually operable signal generator connected to the proportional solenoid for purposes of ground operation or means may be utilized to generate a signal within the electronic governor, which means should be adapted to selectively energize the electronic governor similarly to an overspeeding or underspeeding propeller. When the valve member 75 is thrust downwardly, hydraulic fluid at pump pressure will flow from the high pressure passage 61 through the valve 46 into the passages 62 and 63 and thus to the servo chamber 42. Upon receiving hydraulic fluid within the servo chamber 42, the servo cylinder 32 will be moved toward the right or in the low pitch direction. Low pitch movement of the servo cylinder may be limited by engagement of the appendage 87 on the plate 86 with a low pitch stop 88 which will be described in greater detail hereinafter.

In order to prevent the servo cylinder from engaging with the low pitch stop, it will be necessary to discontinue the signal to the proportional solenoid and to reduce pressure (Ps) in the servo cylinder. The servo pressure may be reduced by imposing another signal upon the proportional solenoid, such signal being similar to the signal transmitted when a propeller overspeeding condition arises. When such signal is received, the valve member 75 is elevated to permit drain of the hydraulic fluid from the servo chamber through the control valve 46 to the low pressure regulating valve 44. It will be quite apparent that alternating signals can be transmitted in the proportional solenoid to reciprocate the servo cylinder 32 and thereby to purge the system of entrapped air and supply all of the passages with hydraulic fluid under pressure.

After the system has been supplied with hydraulic fluid, engine operation may be instituted so that the main pump unit 10 will function and so that the auxiliary motor may be deenergized. With the engine in operation in accordance with a selected power setting, the proportional solenoid operated valve 46 will automatically control flow to and from the servo chamber to effect propeller speed control at the level in keeping with the selected power setting. This automatic operation of the valve 46 was fully described above. Also during engine operation, the topping governor will function to prevent dangerous overspeeding of the propeller in the manner described.

As previously mentioned, the hydraulic system is utilized to cause feathering of the propeller and is also utilized to change the pitch angle thereof to reverse positions. More specifically, when it is desired that the propeller be feathered, the mechanical feathering plunger 90 is thrust downwardly causing downward movement of the movable valve member 91 in the shut off valve 33. It will be noted that when the valve member 91 is thrust downwardly, the valve land 92 will close the passage 34 to the flow of hydraulic fluid at pump pressure. With the passage 34 closed, there can be no high pressure flow through the pressure regulating valve 43 and the control valves 45 and 46 to the servo chamber. Accordingly, there can be no increase in the pressure within the servo chamber such as would cause low pitch movement of the servo cylinder. The movable valve member 91 is provided with a downwardly extending appendage 93 which engages a normally closed spring biased valve plug 94. Upon being thrust downwardly, the valve member 91 thrusts the plug 94 downwardly to permit flow through the valve from a passage 95 to a passage 96. The passage 95 extends between the shut off and feathering valve 33 and the topping governor operated valve 45. At the valve 45, the passage 95 communicates with a port which is normally open to flow from the passage 62 which, as previously described, is connected to and contains fluid at the pressure of the fluid within the servo chamber 42. Accordingly, when the shut off and featering valve is depressed, the servo chamber will drain through the control valve 45 and through the shut off valve into the passage 96 which is connected to the pressurized sump. The drain of hydraulic fluid from the servo chamber may be supplemented by drain through the proportional solenoid operated control valve 46. This may be effected by providing means for transmitting an "overspeeding" signal to the proportional solenoid when the feathering valve is depressed. Upon transmission of such signal, the proportional solenoid will elevate the valve member 75 to permit drain flow from the passage 62 to the low pressure producing valve 44 in the manner previously described.

In all events, the drain of the servo chamber 42 through the feathering and shut off valve 33 will continue as long as the valve member 91 is depressed. Accordingly, the servo cylinder 32 will shift toward full high pitch causing the propeller to be feathered.

It has been mentioned that the solenoid operated valve 35 is energized to effect reverse pitch movement of the propeller blades. It has also been mentioned that a low pitch stop 88 is provided to limit the extent of normal low pitch movement. The arrangement is such that the low pitch stop is shifted from the path of movement of the servo cylinder when the valve 35 is energized for reverse pitch. The said stop is pivotally mounted at 100 within a cap-like member 101 which is threaded to the frame or block structure 102 surrounding the servo cylinder. It will be seen that by adjusting the cap-like member 101 the low pitch stop 88 can be advanced toward or withdrawn from engagement with the servo cylinder. It is important to note that the pivoted stop 88 is disposed within a sleeve 103 which may be moved in a direction opposite to the servo cylinder by hydraulic fluid introduced through the passage 104. The sleeve engages a spring 105 which is seated against a lever 106 included in the pivoted stop structure and when the sleeve is shifted away from the servo cylinder by the force of hydraulic fluid in the passage 104, the spring 105 will pivot the stop 88 in the clockwise direction, as viewed in the drawing, to permit the appendage 87 on the cylinder plate 86 to pass the stop 88 as the cylinder is moved in the low pitch direction. After the cylinder appendage passes the low pitch stop, the propeller pitch angle will be changed to a reverse pitch. The limit of reverse pitch movement of the propeller may be fixed by a stop 107 which is adjustably secured within the cap-like member 101 to engage the appendage 87 in selected positions corresponding to selected reverse pitch angles.

The passage 104 normally contains hydraulic fluid at atmospheric pressure, since said passage is connected by a passage 108 which communicates with the atmospheric sump 12 through the solenoid operated valve 35. However, when the solenoid 109 included in the valve structure is energized, a valve member 110 is elevated to such a position that a land 111 closes the passage from the atmospheric sump and opens the passage 108 to the flow of hydraulic fluid at pump pressure from the passage 34. Thus, when the reversing solenoid 109 is energized, the valve 35 is positioned to cause hydraulic flow at pump pressure through the passage 104 to the sleeve 103 which pivots the low pitch stop out of position, permitting movement of the servo cylinder into reverse pitch positions.

It will be noted that the passage 104 is also connected to a servo 112 which includes a piston 113 adapted to engage a spring biased lever 114 and pivot the same so that the said lever will engage or be in position to engage the movable valve member 65 in the topping governor valve 46 so as to prevent upward movement of said member 65. Accordingly, the servo 112 is utilized to block the topping governor operated valve 45 and assure that the topping governor valve will not function to prevent overspeeding while the propeller blades are being set at reverse pitch. This prevents improper control operation by the topping governor control valve as might occur while the propeller is being put in reverse pitch positions.

The propeller pitch control and servo system as thus far described is the same as the system shown in the Best application. As previously mentioned, the system of this invention incorporates means for limiting the flow rate of fluid to the servo motor so as to limit or reduce the rate of decreasing the pitch angle as compared with the rate of increase thereof.

The said rate limiting means comprises a flow restrictor 200 located in the high pressure passage 61 between the valves 45 and 46. The flow restrictor 200 is shown only schematically in Fig. 1 and may comprise any of a number of conventional elements adapted to cause a reduction in flow rate through a fluid conduit. It will be seen that the pressure drop across the restrictor 200 will be substantially constant and less than 30 p. s. i. With a substantially constant pressure drop, the flow rate can be limited to a substantially constant level for causing a pitch change toward low pitch at a substantially constant and preselected rate during normal pitch control operation. It will also be seen that the restrictor 200 has no effect on flow rate, and thus no effect upon high pitch change rate, when flow is from the servo chamber 42. Thus, the rate of change toward high pitch will be substantially greater than change toward low pitch in normal operation. The same limited rate of change toward low pitch prevails when the propeller is being un-feathered or moved from the feathered angle. That is, in un-feathering, the hydraulic fluid flows through the feathering valve 33, the high pressure regulating valve 43, the control valve 45, and the conduit 61 containing the restrictor 200 before entering the control valve 46 and servo chamber 42.

However, it is desirable not to limit the flow and thus the pitch change rate when changing the pitch angle through the low pitch range into the reverse range. To provide for a rapid pitch change into the reverse pitch range, a check valve 201 is disposed in a passageway 202 which extends between conduit 104 and conduit 54. The check valve 201 may be of conventional form and is normally closed. When the reversing solenoid 109 is energized to actuate valve 35 so as to cause fluid at pump pressure to flow into conduit 104, the increased pressure opens the check valve 201 to the flow of fluid from passageway 104 into passageway 54. Thus, the high pressure regulating valve 43 is effectively by-passed and fluid at pump pressure passes through the valve 45 to the restrictor 200. Pump pressure being substantially greater than the pressure normally in the line 61, the reduced pressure and flow rate on the downstream side of the restrictor 200 will be substantially greater and the flow rate to the servo chamber 42 will be substantially above the normal level. Accordingly, the rate of reducing the pitch or blade angle when turning into the reverse range will be substantially greater than the normal rate of pitch reduction.

It is the primary purpose of providing the pressure regulating valves 43 and 44 in the aforedescribed system to produce or provide a source of pressure a fixed amount greater and a fixed amount less than the servo pressure ($P_s$) in the servo chamber 42. That is, the valves 43 and 44 at all times produce fluid pressures in the system a fixed amount greater and a fixed amount less than the servo pressure no matter what the servo pressure happens to be. Now, in at least some installations, it has been determined that the loads imposed upon the servo motor or upon the servo cylinder 32 are substantially constant. Under substantially constant load conditions, it is unnecessary to regulate or produce pressures within the system to assure substantially constant pitch change rates toward high pitch and toward low pitch. Accordingly, the pressure regulating valves 43 and 44 may be eliminated from the pitch control and servo system where the servo loads are substantially constant. Such a system is disclosed in Fig. 2.

For the most part, the system of Fig. 2 is similar to the system of Fig. 1 and like elements of the system are identified by the same reference numerals. In eliminating the pressure regulating valves 43 and 44 from the system of Fig. 2, the high pressure line 54 to the governor valve 45 is directly connected to the passage 34 containing fluid at pump pressure and the low pressure line 58 to the control valves 45 and 46 is directly connected to the drain line 60 extending to the pressurized sump 15. In addition, the servo chamber 42 is connected by the conduit 50 directly to the conduit 63. With the aforedescribed modifications, the system of Fig. 2 is the same as that shown in the previously mentioned Best application except that the high and low pressure regulating valves are eliminated.

The system of Fig. 2 is further modified to embrace the improvements of this invention by providing a restrictor 205 in the line 61 which is the high pressure line between the control valves 45 and 46. The restrictor 205 performs the same function as the restrictor 200 described in connection with the embodiment shown in Fig. 1. That is, the restrictor 205 reduces the flow rate in the conduit 61 by providing a pressure drop from the pump pressure on the upstream side of the said restrictor. There is no restrictor placed in the drain passage 58 or 58a so that fluid may be drained from the servo chamber 42 into the pressurized sump 15 without a pressure drop and without flow limitation, other than the limitation imposed by valve 46.

Accordingly, in the embodiment of the invention shown in Fig. 2, the servo cylinder 32 is moved in the low pitch direction by introducing fluid to the chamber 42 from the pump, but the restrictor 205 reduces the rate of flow to the said servo chamber so as to provide for a preselected rate of movement or rate of pitch change in the low pitch direction. The servo cylinder 32 is moved in the high pitch direction by draining fluid from the servo chamber 42 into the pressurized sump 15 without limiting the flow so that movement of the servo cylinder and propeller in the high pitch direction will be at a substantially greater rate than the movement in the low pitch direction. As in the first described embodiment, the flow control valve 46 selectively connects the servo chamber 42 to the high pressure source and to the drain.

In order that there will be no undesirable flow rate limitation imposed when the propeller is being moved through the low pitch range into the reverse pitch range, a check valve 206 is provided in a passageway 207 interconnecting the high pressure port of the control valve 46 and the conduit 104. As in the first described embodiment, the conduit 104 will contain hydraulic fluid at pump pressure when the solenoid operated reversing valve 35 is energized. When the conduit 104 receives fluid at pump pressure, the check valve 206 is opened to permit the flow of fluid at pump pressure in the line 207 to the control valve 46. It is desirable to have some flow limitation in the line 207 and, for this purpose, a flow restrictor 208 is provided in said line. The restrictor 208 reduces or limits the flow but to a lesser degree than the restrictor 205. Accordingly, the high pressure flow through the valve 46 when the propeller is being moved into the reverse pitch range is greater than the high pressure flow through the valve 46 during normal pitch control and when the propeller is being unfeathered. Thus, the rate of movement into low pitch and into the reverse range is greater than the low pitch change rate during normal operation.

Accordingly, the propeller pitch control and servo system of this invention as shown in the two described embodiments and in any other embodiments thereof features means adapted to limit the rate of pitch change in the low pitch direction so as to reduce the possibility of propeller overspeeding during normal pitch control operation and when the propeller is being unfeathered. In addition, the invention embraces means for providing a more rapid rate of pitch change in the low pitch direction when the propeller pitch is being reversed through the low pitch range into the reverse pitch range.

The invention claimed is:

1. In an aeronautical propeller pitch control and servo system which includes an hydraulically operated servo motor adapted to effect blade angle changes toward high and low pitch in a range including the feathered angle and reverse pitch of the propeller, the combination comprising a source of fluid under pressure, a drain, valve means connected with said servo motor and having a pair of passageways respectively connected with the source and with the drain, the said valve means being operable to selectively connect the servo motor with said source or said drain either to increase or to decrease the pitch angle, flow limiting means in one of said passageways to limit the rate of servo motor operation when said servo motor is decreasing the pitch angle during normal operation and when the propeller is being removed from the feathered angle, and means for reversing the pitch of the propeller including a valve adapted to increase flow in said one passageway whereby to increase the rate of servo motor operation in decreasing the pitch angle.

2. In an aeronautical propeller pitch control and servo system which includes an hydraulically operated servo motor adapted to effect blade angle changes toward high and low pitch in a range including the feathered angle and reverse pitch of the propeller, the combination comprising a source of fluid under pressure, a drain, valve means connected with said servo motor and having a high pressure side and a low pressure side, means connecting said high pressure side and said source, means connecting said low pressure side and said drain, said valve means being operable to selectively connect said servo motor to said source and to said drain to either increase or to decrease the pitch angle, flow limiting means in one of said connecting means to limit the rate of servo motor operation when said servo motor is decreasing the pitch angle during normal operation and when the propeller is being removed from the feathered angle, and means for reversing the pitch of the propeller including a valve adapted to increase the flow into the high pressure side of said valve means whereby to increase the rate of servo motor operation in decreasing the pitch angle.

3. In an aeronautical propeller pitch control and servo system which includes an hydraulically operated servo motor adapted to effect blade angle changes within a range which includes the feathered angle and reverse pitch, the combination comprising a source of fluid under pressure, a drain, a propeller speed responsive valve having a high pressure side connected with said source, a low pressure side connected with said drain, and also having a connection with said servo motor, said valve being constructed and arranged to interconnect said servo motor and said drain in response to propeller overspeeding and to interconnect said source and said servo motor in response to propeller underspeeding and when the propeller is being unfeathered, restrictor means in the connection between said source and said valve to reduce the flow of fluid from said source whereby to limit the rate of blade angle change toward low pitch, and means connected with the high pressure side of said valve to increase the flow thereto and to said servo motor when the propeller blade angle is being reversed.

4. In an aeronautical propeller pitch control and servo system which includes an hydraulically operated servo motor adapted to change the propeller blade angle within a range including the feathered angle and reverse pitch, the combination comprising a source of fluid under pressure, a drain, a control valve having a high pressure side and a low pressure side respectively connected with said source and said drain, said valve being connected with said servo motor and being adapted to selectively connect the servo motor with the drain and with the source to increase and decrease, respectively, the blade angle, a restrictor in the connection between the source and the control valve for providing a pressure drop therein whereby to control the flow rate therethrough and to limit the rate of servo motor operation in decreasing the blade angle, and control means for reversing the pitch of the propeller including a second valve having a conduit connected with the high pressure side of the control valve and adapted to increase the flow rate thereto whereby to increase the rate of servo motor operation in decreasing the blade angle into reverse pitch.

5. In an aeronautical propeller pitch control and servo system which includes an hydraulically operated servo motor having a servo chamber and adapted to decrease and to increase the blade angle in response to pressure increase and decrease, respectively, in the chamber, and to make such blade angle changes within a range including a feathered angle and reverse pitch, the combination comprising a source of fluid under pressure, a drain, a control valve having a high pressure side and a low pressure side respectively connected with said source and said drain, said valve being connected with said chamber and being adapted to selectively connect the chamber with the drain and with said source, a restrictor in the connection between the source and the control valve for providing a pressure drop therein whereby to control the flow rate therethrough and to limit the rate of servo motor operation in decreasing the blade angle, and control means for reversing the pitch of the propeller including a conduit connected with the high pressure side of the control valve and also including a second valve in said conduit which is adapted to increase the flow rate to the high pressure side of the said control valve whereby to increase the rate of servo motor operation in decreasing the blade angle into reverse pitch.

6. In an aeronautical propeller pitch control and servo system which includes an hydraulically operated servo motor adapted to decrease the propeller blade angle when it receives fluid under pressure and to increase the blade angle when it drains, the range of blade angle changes including the feathered angle and reverse pitch of the propeller, the combination comprising a source of fluid under pressure, a drain, a flow control valve having a high pressure side and a low pressure side respectively connected with said source and said drain and having a connection with the servo motor to selectively connect the same with the source and the drain, a restrictor in the connection between the source and the valve to provide a pressure drop therein whereby to control the flow rate therethrough and to limit the rate of servo motor operation in decreasing the blade angle, and control means for reversing the propeller pitch including a conduit connected with the high pressure side of the control valve, and a second valve in said conduit opening and closing said conduit to fluid under pressure whereby the flow to said high pressure side may be increased to increase the rate of servo motor operation in decreasing the blade angle into the reverse pitch range.

7. In an aeronautical propeller pitch control and servo system which includes an hydraulically operated servo motor having a servo chamber and adapted to respectively decrease and increase the propeller pitch in response to pressure increase and decrease in said chamber, the combination comprising a source of fluid under pressure, a drain, pressure regulating means connected with said source and responsive to pressure in the chamber to provide hydraulic fluid at a pressure a fixed amount greater than fluid pressure in said chamber, a control valve having a high pressure side connected with said pressure regulating means and a low pressure side connected with said drain, said valve being connected with said chamber and adapted to selectively connect the same with the pressure regulating means and said drain, a restrictor in the connection between the valve and the pressure regulating means to reduce the flow rate therein whereby to limit the rate of servo motor operation in decreasing the pitch, and control means for reversing the propeller pitch including means defining a passageway between said source and said connection, and a normally closed valve in said passageway which when opened introduces fluid at the pressure of said source to said restrictor whereby the flow rate in said connection is increased to increase the rate of servo motor operation in decreasing the blade angle into reverse pitch.

8. In an aeronautical propeller pitch control and servo system which includes an hydraulically operated servo motor having a servo chamber and adapted to decrease and to increase the blade angle in response to pressure increase and decrease, respectively, within said chamber, the combination comprising a source of fluid under pressure, a drain, first pressure regulating means connected with said source and responsive to fluid pressure in said chamber to provide hydraulic fluid at a pressure a fixed amount greater than pressure in said chamber, second pressure regulating means connected with said drain and responsive to fluid pressure in said chamber to provide a fluid pressure a fixed amount less than pressure in said chamber which fixed amount is substantially equal to the first mentioned fixed amount, a control valve connected with said chamber and having a high pressure side and a low pressure side connected with said first and second pressure regulating means, respectively, said valve being adapted to selectively connect said chamber with said first and second pressure regulating means, a restrictor disposed in the connection between said high pressure side and said first pressure regulating means for providing a pressure drop therein whereby to limit flow therethrough and to limit servo motor operation in decreasing the blade angle to a rate less than the rate of operation in increasing the blade angle, and control means for reversing the propeller pitch including means defining a passageway between said source and said connection, and a normally closed valve in said passageway which when opened introduces fluid at the pressure of said source to said restrictor whereby the flow rate in said connection is increased to increase the rate of servo motor operation when decreasing the blade angle into the reverse pitch range.

9. In an aeronautical propeller pitch control and servo system which includes an hydraulically operated servo motor having a servo chamber and adapted to respectively decrease and increase the propeller blade angle in response to pressure increase and decrease in said chamber, the combination comprising a source of fluid under pressure, a drain, pressure regulating means connected with said source and responsive to pressure in the chamber to provide hydraulic fluid at a pressure a fixed amount greater than fluid pressure in said chamber, a control valve connected with said chamber and having a high pressure side connected with said pressure regulating means and a low pressure side connected with said drain, said control valve being adapted to selectively connect the chamber with said high and low pressure sides, a restrictor in the connection between the valve and the pressure regulating means to reduce the flow rate therein whereby to limit the rate of servo motor operation in decreasing the blade angle, and control means for reversing the propeller pitch including means defining a passageway communicating with said connection, a check valve in said passageway preventing flow from said connection through said passageway, and a control valve for connecting said passageway and said source to introduce fluid at the pressure of said source to said restrictor whereby the flow rate in said connection is increased to increase the rate of servo motor operation when decreasing the blade angle into reverse pitch.

10. In an aeronautical propeller pitch control and servo system which includes an hydraulically operated servo motor adapted to increase and decrease propeller pitch in a range including a feathered angle and reverse pitch, the combination comprising a source of fluid under pressure, a drain, a control valve having a high pressure side connected with the source and a low pressure side connected with the drain, said valve being adapted to selectively connect its high pressure and low pressure sides with the servo motor to respectively decrease and increase the pitch, a flow restrictor in the connection between said valve and said source to limit the rate of servo motor operation in decreasing the pitch, and control means for reversing the pitch including means defining a passageway between said source and the high pressure side of said control valve, and a normally closed valve in said passageway which when opened provides for an increased rate of servo motor operation in decreasing the pitch.

11. In an aeronautical propeller pitch control and servo system which includes an hydraulically operated servo motor adapted to increase and to decrease propeller pitch, the combination comprising a source of fluid under pressure, a drain, a control valve connected to the servo motor and having a high pressure side connected with the source and a low pressure side connected with the drain, said valve being operable to selectively connect the servo motor with its high pressure side and low pressure side to respectively decrease and increase the pitch, a flow restrictor in the connection between said valve and said source to limit the rate of servo motor operation in decreasing the pitch, and control means for reversing the pitch including means defining a second passageway between said source and the high pressure side of said control valve, a second control valve in said second passageway which is normally open to atmosphere and normally closed to said source, and a check valve in said second passageway preventing flow from said high pressure side to said second valve, said second valve being adapted to selectively permit flow from said source in said second passageway to said high pressure side of said control valve to provide for an increased rate of servo motor operation in decreasing the pitch.

12. In an aeronautical propeller pitch control and servo system which includes an hydraulically operated servo motor adapted to increase and decrease the feathered angle and reverse pitch, the combination comprising a source of fluid under pressure, a drain, a control valve connected to said servo motor and having a high pressure side connected with the source and a low pressure side connected with the drain, said valve being adapted to selectively interconnect the servo motor with said high and low pressure sides to respectively decrease and increase the pitch, a flow restrictor in the connection between said valve and said source to limit the rate of servo motor operation in decreasing the pitch, and control means for reversing the pitch including means defining a second passageway between said source and the high pressure side of said control valve, a normally closed valve in said second passageway, and a second restrictor in said second passageway permitting flow therethrough sufficient to increase the rate of servo motor operation in decreasing the pitch.

13. In an aeronautical propeller pitch control and servo system which includes an hydraulically operated servo motor adapted to increase and decrease propeller pitch in a range including the feathered angle and reverse pitch, the combination comprising a source of fluid under pressure, a drain, a control valve connected to said servo motor and having a high pressure side connected with the source and a low pressure side connected with the drain, said valve being adapted to selectively connect the servo motor with its high and low pressure sides to respectively decrease and increase the pitch, a flow restrictor in the connection between said valve and said source to limit the rate of servo motor operation in decreasing the pitch, and control means for reversing the pitch including means defining a second passageway between said source and the high pressure side of the said control valve, a second valve in said second passageway which is normally closed to said source and open to atmosphere, a check valve in said second passageway preventing flow from said high pressure side to said second valve, a second restrictor in said passageway, and said second valve being adapted to permit flow between said source and said high pressure side through said second restrictor at a rate providing for an increased rate of servo motor operation in decreasing the pitch.

References Cited in the file of this patent

UNITED STATES PATENTS

| Number | Name | Date |
| --- | --- | --- |
| 913,853 | Rowntree | Mar. 2, 1909 |
| 1,816,829 | Leeuw | Aug. 4, 1931 |
| 2,263,421 | Harrington | Nov. 18, 1941 |
| 2,381,923 | Obtresal | Aug. 14, 1945 |
| 2,586,442 | Seagreen | Feb. 19, 1952 |
| 2,678,103 | Martin et al. | May 11, 1954 |